Figure 1:
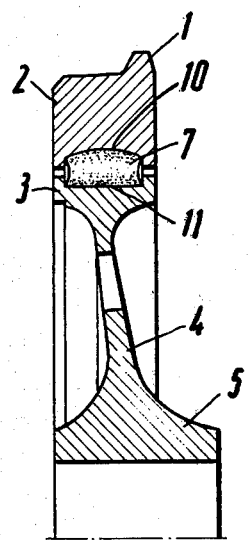

United States Patent [19]

Raquet et al.

[11] 3,986,747

[45] Oct. 19, 1976

[54] RESILIENTLY FLANGED RAILWAY WHEEL

[75] Inventors: Erwin Raquet, Sprockhovel; Helmut Licht, Bochum, both of Germany

[73] Assignee: Fried. Krupp Huttenwerke AG, Bochum, Germany

[22] Filed: Oct. 3, 1974

[21] Appl. No.: 511,916

[30] Foreign Application Priority Data
Oct. 24, 1973  Germany .................................. 2353221

[52] U.S. Cl. ..................................... 295/11; 295/7; 295/21; 295/23
[51] Int. Cl.² ....................... B60B 3/04; B60B 9/14; B60B 17/00; B60B 23/12
[58] Field of Search ..................... 295/7, 11, 21, 23

[56] References Cited
UNITED STATES PATENTS

| | | | |
|---|---|---|---|
| 8,526 | 11/1851 | Hodge ................................. | 295/11 |
| 1,958,642 | 5/1934 | Rosenberg ........................... | 295/11 |
| 2,012,369 | 8/1935 | Bacqueyrisse ....................... | 295/11 |
| 2,548,839 | 4/1951 | Coombes ............................. | 295/11 |
| 3,127,211 | 3/1964 | Kordes et al ........................ | 295/11 |

FOREIGN PATENTS OR APPLICATIONS

| | | | |
|---|---|---|---|
| 738,768 | 10/1932 | France ................................ | 295/11 |
| 1,206,006 | 12/1965 | Germany ............................ | 295/11 |

Primary Examiner—Robert J. Spar
Assistant Examiner—Howard Beltran
Attorney, Agent, or Firm—Haseltine, Lake & Waters

[57] ABSTRACT

A rubber shock-absorbent track wheel in which annular grooves are provided on the ring of the wheel and on the rim of the wheel disc. The grooves are formed between shoulders, and a clearance space is defined between the grooves and the shoulder. Prestressed rubber plates located within the clearance space have plane areas when in the original state. The two annular grooves are turned to one another so that the height of the clearance space varies over its width, and the height of the clearance space is maximum at the centers of the grooves. The rubber plates are more prestressed at their outer areas than in the middle areas of the rubber plates when positioned between the base of the annular grooves of wheel disc and ring.

2 Claims, 7 Drawing Figures

RESILIENTLY FLANGED RAILWAY WHEEL

The invention relates to a rubber shock-absorbent track wheel having respectively an annular groove on the ring of the wheel and on the rim of the wheel formed by lateral shoulders and prestressed rubber plates spaced therein having an approximately rectangular area, the annular slot formed by the two annular grooves turned towards one another having a clearance height varying over its width.

With a known such track wheel the varying clearance height for the rubber plates is formed by an arching, the crown of which is approximately as high as the shoulder pair limiting the annular groove. A recess corresponding to the profile of the arching is worked into the base of each rubber plate turned towards the arching.

Because of the arching in the annular groove of the ring the wheel ring has a larger material volume and therefore a longer service life. Moreover the action of the rubber elasticity is improved in comparison to track wheels without arching as the rubber elasticity is harder axially without noticeably forfeiting shock-absorbent capabilities.

Experiments with the axial elastic temper of this rubber shock-absorbent track wheel have shown that the course of the elastic characteristic curve is degressive (German patent specification 1,206,006).

The object of the invention is to create a rubber shock-absorbent track wheel having an improved axial elastic temper and not to diminish the performance of the radial impact repulse in comparison to the known track wheel.

The object is solved according to the invention with a rubber shock-absorbent track wheel of the type named at the beginning in that at least one of the annular grooves has an arch-shaped recess from the shoulders to the centre and the rubber plates in the unprestressed state have plane areas or respectively one surface having an arch-shaped recess.

The rubber shock-absorbent track wheel, the grooves and rubber plates of which are shaped according to the invention, has an improved axial temper having a progressive path of the elastic characteristic curve. The ability to repulse radial impacts is practically not affected by the measures of the invention.

Preferably both annular grooves have arch-shaped recesses. Correspondingly both surfaces of the rubber plates have arch-shaped recesses.

With regard to the axial and radial elastic temper surprisingly good results were attained with a track wheel in which the rubber plates having approximately 80 Shore hardness in the assembled state, when they are compressed by approximately a third of their height in the unprestressed state, have an average height of 10 to 15 mm which is equivalent to 0.4 to 0.6 inch. Although the rubber plates of the track wheels according to the invention are only approximately half as high as the rubber plates of the known track wheels the penalty paid because of this of the wheel not being able to deflect radial impacts is comparatively small and is balanced by the attainment of axial elastic temper.

The particular advantages attained by the invention therefore comprise the wheel having improved axial strength, improved dampening of the vibrations between the wheel ring and the wheel disc and consequently an improved grip on the track and slight rolling friction.

Figure 2:
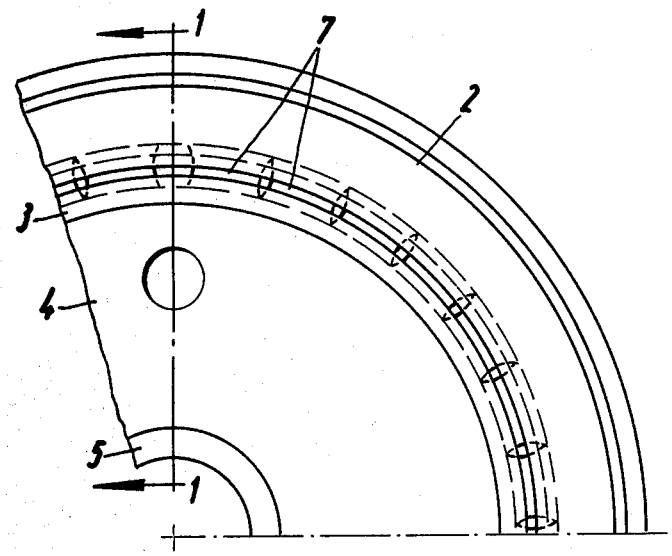
Figure 5:
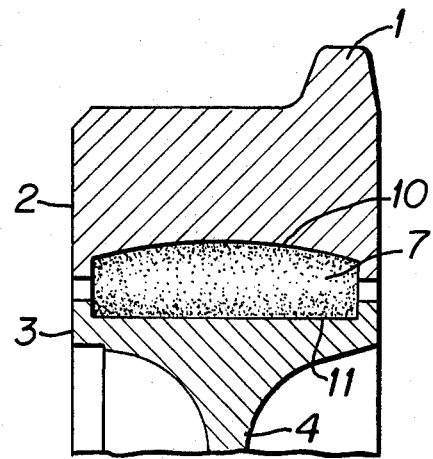
Figure 6:
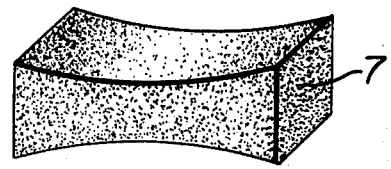
Figure 7:
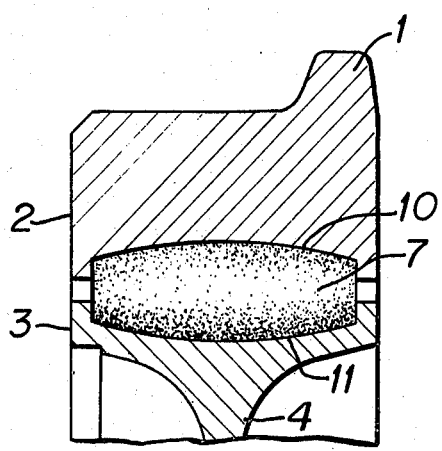

The invention is described in more detail by a drawing showing three different exemplified embodiments as follows. In detail FIG. 1 shows a cross section of a track wheel as far as the axis, taken along line 1—1 in FIG. 2, FIG. 2 shows a cut-away portion of the track wheel according to FIG. 1 in section, FIG. 3 shows a cross section in the area of a wheel ring, FIG. 4 shows a perspective front view of a rubber plate for a track wheel according to FIG. 3, FIG. 5 shows a cross section in the area of the wheel ring of a track wheel in another exemplified embodiment, FIG. 6 shows a perspective view of a rubber plate in section for a track wheel according to FIG. 5 and FIG. 7 shows a cross section in the area of the wheel ring of the track wheel in another exemplified embodiment.

The rubber shock-absorbent track wheels represented in the drawing consists of a wheel ring 2 provided with a flange 1 and a wheel disc 4 comprising a rim 3 and a hub 5. On its inner periphery the wheel ring 2 bears an annular groove 10 which is limited by a shoulder pair. At its outer periphery the wheel rim 3 bears an annular groove 11, which is likewise limited by a shoulder pair. The two annular grooves 10, 11 are turned towards one another and form an annular slot in which a plurality of highly prestressed rubber plates 7 are spaced from one another over the periphery.

The rubber plates 7 have rectangular base areas. They lie formlocking between the lateral shoulders of the annular grooves 10, 11. As there is a slot between the opposite shoulder pairs of the wheel ring 2 and the rim 3 the wheel ring 2 can move axially and radially in relation to the wheel disc 4. The elastic temper of the rubber plates 7 opposes this load-controlled movement.

Figure 3:
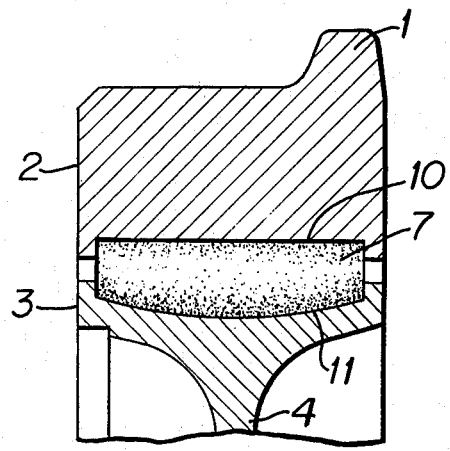
Figure 4:
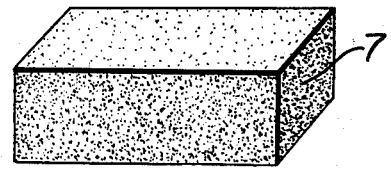

In the wheel represented in FIG. 3 and 4 the annular groove in the rim 3 has an arch-shaped recess whereas the annular groove in the wheel ring 2 has a cylindrical-shaped surface. From this results that the radial clearance height is at its largest in the centre of the wheel and decreases continuously towards the shoulders. As the rubber plates sitting in the annular slot between the wheel ring 2 and the wheel rim 3 have a constant height over their width in the unprestressed state, in the assembled state its prestressing increases continuously from the middle towards the edges.

With the track wheel according to FIG. 5 and with the base plates according to FIG. 6, which have arch-shaped recesses in both surfaces, principally the same conditions prevail. The same is true for the track wheel according to FIG. 7 in which both annular grooves have arch-shaped recesses. Rubber plates having both arch-shaped recesses or plane surfaces may intersect in the annular slot. In each of the three exemplified embodiments for the track wheel the elastic characteristic curve is progressive. For the track behaviour this means increased safety. From FIGS. 3 to 7, which are according to scale, it results that the average clearance height of the rubber plates in comparison to the clearance height of the rubber plates in the known track wheels is decreased approximately by half. It has been shown that in spite of this considerable decrease in the clearance height the penalty paid of loss of ability to dampen radial impacts is small in comparison to the improved axial elastic temper and can therefore be readily accepted, so that the quality of the wheel is altogether improved.

We claim:

1. Rubber shock-absorbent track wheel having respectively an annular groove on the ring of the wheel and on the rim of the wheel disc formed by lateral shoulders, said shoulders forming together with said groove a clearance space, prestressed rubber plates spaced in said clearance space and comprising a substantially rectangular solid, said two annular grooves being turned towards one another and forming a clearance height varying over the width of said clearace space, so that the height is at its maximum at the center of the grooves, at least one of the annular grooves having a transversely arch-shaped central recess between said shoulders, the rubber plates when in the original state having plane areas; said rubber plates being more prestressed at their outer areas than in the middle areas of said rubber plates when positioned between the base of the annular grooves of wheel disc and ring.

2. Rubber shock-absorbent track wheel according to claim 1, wherein both surfaces of the rubber plates have transverse arch-shaped recesses.

\* \* \* \* \*